United States Patent

Warnke et al.

[11] Patent Number: 5,647,800
[45] Date of Patent: Jul. 15, 1997

[54] CROSS GROOVE CONSTANT VELOCITY JOINT HAVING FIXED CENTER

[75] Inventors: James William Warnke; Steven Lee Ingalsbe, both of Toledo, Ohio

[73] Assignee: Dana Corporation, Toledo, Ohio

[21] Appl. No.: 465,611

[22] Filed: Jun. 5, 1995

Related U.S. Application Data

[63] Continuation of Ser. No. 750,404, Aug. 27, 1991, abandoned.

[51] Int. Cl.⁶ ............................................. F16D 3/223
[52] U.S. Cl. ............................................ 464/144; 464/906
[58] Field of Search ............................ 464/144, 145, 464/906

[56] References Cited

U.S. PATENT DOCUMENTS

| | | |
|---|---|---|
| 1,665,280 | 4/1928 | Rzeppa . |
| 2,047,660 | 7/1936 | Anderson ................................. 464/144 |
| 2,319,100 | 5/1943 | Anderson ................................. 464/144 |
| 2,322,570 | 6/1943 | Dodge ..................................... 464/144 |
| 2,949,022 | 8/1960 | Leon ........................................ 464/144 |
| 3,370,441 | 2/1968 | Aucktor ................................... 464/144 |
| 3,633,382 | 1/1972 | Westercamp ............................ 464/144 |
| 3,934,429 | 1/1976 | Takahashi et al. . |
| 3,935,717 | 2/1976 | Welschof . |
| 4,090,375 | 5/1978 | Takahashi et al. . |
| 4,950,206 | 8/1990 | Jacob ....................................... 464/145 |

FOREIGN PATENT DOCUMENTS

| | | |
|---|---|---|
| 1455037 | 10/1976 | United Kingdom . |
| 2092267 | 8/1982 | United Kingdom . |
| 2181501 | 4/1987 | United Kingdom . |

OTHER PUBLICATIONS

Universal Joint and Driveshaft Design Manual (Advances In Engineering Series No. 7) Published By: The Society Of Automotive Engineers, Inc., 1979.

Universal Joint and Driveshaft Design Manual (advances in Engineering No. 7); The society of Automotive Engineers, Inc. 1979.

*Primary Examiner*—Daniel P. Stodola
*Assistant Examiner*—Eileen A. Dunn
*Attorney, Agent, or Firm*—MacMillan, Sobanski & Todd

[57] ABSTRACT

A cross groove variety of constant velocity universal joint includes an inner race having a plurality of grooves formed in an outer surface thereof and an outer race having a plurality of grooves formed in an inner surface thereof. For each pair of associated inner and outer race grooves, the inner race groove is inclined in one direction relative to the rotational axis of the joint, while the outer race groove is inclined in the opposite direction. A ball is disposed in each of the associated inner and outer race grooves for providing a driving connection between the inner and outer races. A cage is provided for retaining the balls in the grooves. In a first embodiment, mating spherical surfaces are formed on the inner surface of the outer race and the outer surface of the cage. The engagement of these spherical surfaces prevents the center of the joint from moving axially during use. In a second embodiment, mating spherical surfaces are formed on the inner surface of the cage and the outer surface of the inner race for the same purpose.

1 Claim, 1 Drawing Sheet

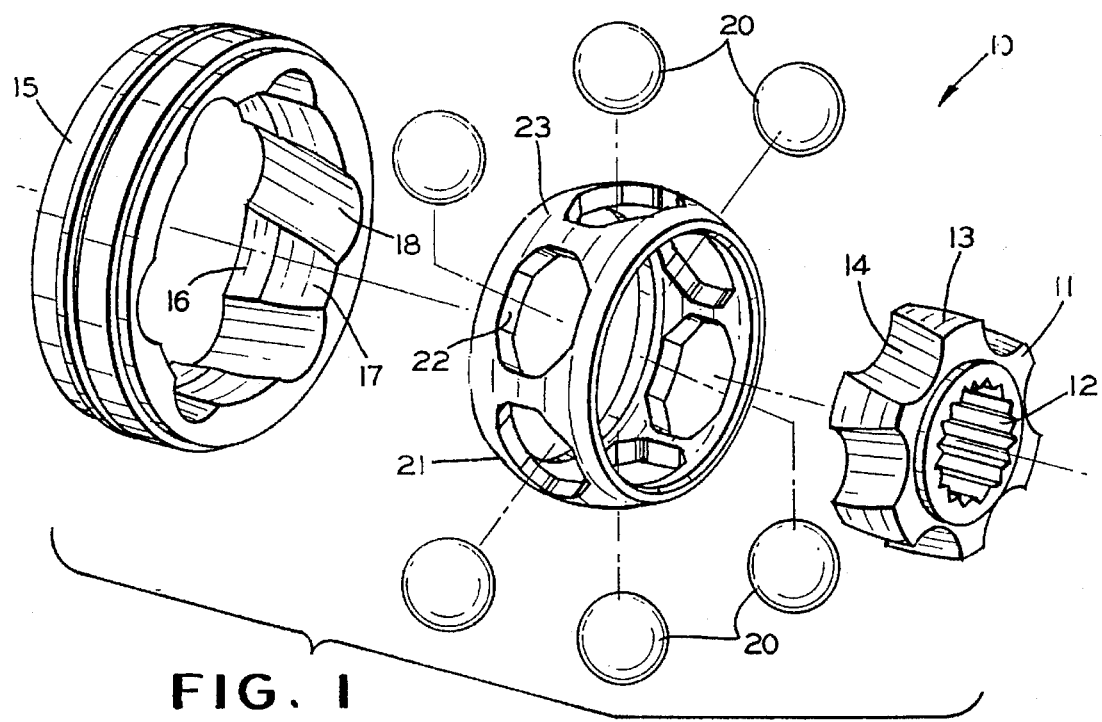
FIG. 1
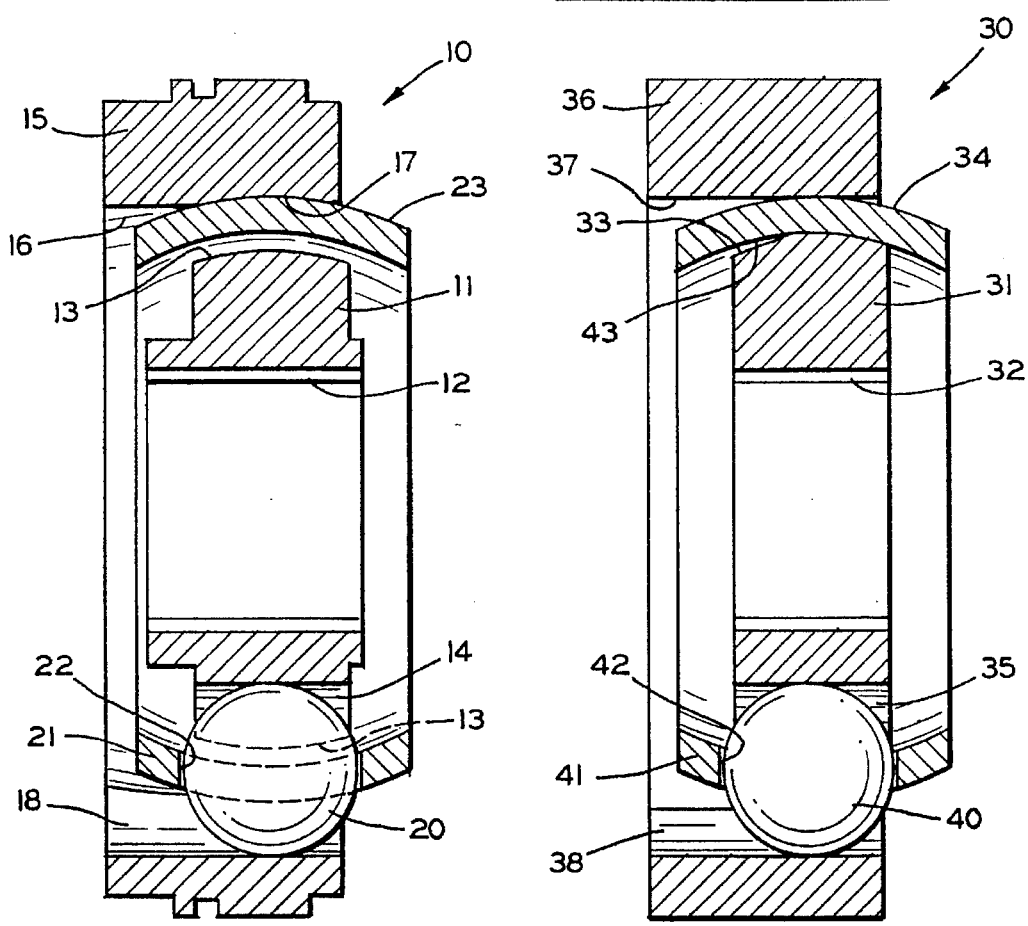
FIG. 2
FIG. 3

CROSS GROOVE CONSTANT VELOCITY JOINT HAVING FIXED CENTER

This application is a continuation of application Ser. No. 07/750,404 filed 27 Aug. 1991, now abandoned.

BACKGROUND OF THE INVENTION

This invention relates in general to universal joints and in particular to an improved structure for a constant velocity type of universal joint.

A universal joint is a mechanical coupling device which provides a rotational driving connection between two rotatable shafts, while permitting such shafts to be oriented at an angle relative to one another. Universal joints are commonly used in the drive train systems of vehicles. For example, a universal joint is commonly used to provide a rotational driving connection between a drive shaft rotatably driven by a vehicle engine and an input shaft connected to the vehicle axle assembly. This is because the drive shaft and the axle assembly input shaft are rarely co-axially aligned. To accommodate this non-alignment, while still providing a rotational driving connection, a universal joint is provided therebetween.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the angle of rotation. In a non-constant velocity type of universal joint, the instantaneous angular velocities of the two shafts vary with the angle of rotation (although the average angular velocities for a complete revolution are equal).

A typical structure for a constant velocity universal joint includes a cylindrical inner race connected to one of the shafts and a hollow cylindrical outer race connected to the other of the shafts. The outer surface of the inner race and the inner surface of the outer race have respective pluralities of grooves formed therein. The grooves extend linearly and have generally semi-circular cross sectional shapes. Each groove formed in the outer surface of the inner race is associated with a corresponding groove formed in the inner surface of the outer race. A ball is disposed in each of the associated pairs of grooves. The balls provide a driving connection between the inner and outer races. An annular cage is typically provided between the inner and outer races for retaining the balls in the grooves. The cage is provided with a plurality of circumferentially spaced openings for this purpose.

In one known variety of the ball and cage type of constant velocity joint, the grooves formed in the outer surface of the inner race are oriented so as to be alternately inclined relative to the rotational axis of the joint. Similarly, the grooves formed in the inner surface of the outer race are alternately inclined relative to the rotational axis of the joint. For each pair of associated inner and outer race grooves, the inner race groove is inclined in one direction relative to the rotational axis of the joint, while the outer race groove is inclined in the opposite direction. Thus, this variety of joint is commonly referred to as a cross groove constant velocity joint.

Known cross groove joints permit relative axial movement between the inner race and the cage, as well as between the cage and the outer race. Thus, the center of the joint (which is defined by the point of intersection of the rotational axes of the two shafts connected thereto) can move axially during use. Because there is no physical engagement between the inner race and the cage or between the cage and the outer race, cross groove joints have been found to be well suited for high rotational speed applications.

However, some applications for universal joints require the use of a fixed center type of joint, i.e., a joint wherein the point of intersection of the rotational axes of the two shafts cannot move axially during use. Although non-cross groove varieties of constant velocity joints are known which have fixed centers, some of those structures have been found to be not well suited for high rotational speed applications. Of those non-cross groove varieties which are suited for high rotational speed applications, it has been found to be inconvenient and uneconomical to manufacture two different types of joint structures, namely, the cross groove variety (which permits axial movement of the joint center) and the non-cross groove variety (which prevents such axial movement). Accordingly, it would be desirable to provide a cross groove variety of constant velocity joint which can be manufactured so as to be easily adapted for use having either a fixed center or an axially movable center.

SUMMARY OF THE INVENTION

This invention relates to an improved structure for a cross groove variety of constant velocity universal joint. The joint includes an inner race having a plurality of grooves formed in an outer surface thereof and an outer race having a plurality of grooves formed in an inner surface thereof. The grooves formed in the outer surface of the inner race are oriented so as to be alternately inclined relative to the rotational axis of the joint. Similarly, the grooves formed in the inner surface of the outer race are alternately inclined relative to the rotational axis of the joint. For each pair of associated inner and outer race grooves, the inner race groove is inclined in one direction relative to the rotational axis of the joint, while the outer race groove is inclined in the opposite direction. A ball is disposed in each of the associated inner and outer race grooves for providing a driving connection between the inner and outer races.

A cage is provided for retaining the balls in the grooves. Means are provided for preventing the inner race, the cage, and the outer race from moving axially relative to one another during use. In a first embodiment, such means includes mating spherical surfaces formed on the inner surface of the outer race and the outer surface of the cage. The engagement of these spherical surfaces permits the cage to rotate relative to the outer race during use, but prevents it from moving axially relative thereto. Because of the crossing orientation of the grooves formed in the inner and outer races, the inner race is also prevented from moving axially relative to the cage and the outer race. In a second embodiment, such means includes mating spherical surfaces formed on the inner surface of the cage and the outer surface of the inner race.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is an exploded perspective view of a constant velocity universal joint in accordance with this invention.

FIG. 2 is a sectional elevational view of the constant velocity joint of FIG. 1 shown assembled.

FIG. 3 is a sectional elevational view similar to FIG. 2 of an alternate embodiment of the constant velocity joint.

DETAILED DESCRIPTION OF THE PREFERRED EMBODIMENTS

Referring now to the drawings, there is illustrated in FIGS. 1 and 2 a constant velocity universal joint, indicated generally at 10, in accordance with this invention. The joint 10 includes an inner race 11 which is generally hollow and cylindrical in shape. The inner race 11 has a central splined opening 12 formed therethrough. The splined opening 12 permits a shaft (not shown) to be inserted therein for rotation with the inner race 11 about an axis, as is well known in the art.

The inner race 11 has an outer surface 13 which is generally cylindrical in shape, but which is slightly curved along the axis of rotation. A plurality of grooves 14 are formed in the outer surface 13 of the inner race 11. In the illustrated embodiment, six of such grooves 14 are formed in the outer surface 13 of the inner race 11. The grooves 14 extend linearly and have generally semi-circular cross sectional shapes. The grooves 14 formed in the outer surface 13 of the inner race 11 are oriented so as to be alternately inclined relative to the rotational axis of the joint 10.

The joint 10 further includes an outer race 15 which is also generally hollow and cylindrical in shape. The outer race 15 may be formed having means for connecting it to a shaft (not shown) for rotation about the axis of rotation, as is well known in the art. Alternatively, the outer race 15 may be formed integrally with such shaft. The outer race 15 has an inner surface 16 which is generally cylindrical in shape, but which is slightly curved relative to the axis of rotation. The inner surface 16 of the outer race 15 is further formed having a generally spherical portion 17, the purpose of which will be explained below.

A plurality of grooves 18 are formed in the inner surface 16 of the outer race 15. The number of such grooves 18 is the same as the number of grooves 14 formed in the outer surface 13 of the inner race 11. As with the inner race grooves 14, the outer race grooves 18 extend linearly and have generally semi-circular cross sectional shapes. The grooves 18 formed in the inner surface 16 of the outer race 15 are oriented so as to be alternately inclined relative to the rotational axis of the joint 10. Each of the outer race grooves 18 is associated with a corresponding one of the inner race grooves 14. For each pair of associated inner and outer race grooves 14 and 18, the inner race groove 14 is inclined in one direction relative to the rotational axis of the joint, while the outer race groove 18 is inclined in the opposite direction.

A plurality of balls 20 are provided for effecting a driving connection between the inner race 11 and the outer race 15. One ball 20 is provided for each of the associated pairs of inner race grooves 14 and outer race grooves 18. As shown in FIG. 2, each ball 20 extends into both the inner race groove 14 and the outer race groove 18. Thus, when the inner race 11 is rotated about the axis of rotation, the outer race 15 rotates therewith. A cage 21 is provided for retaining the balls 20 within the grooves 14 and 18. The cage 21 is generally hollow and cylindrical in shape, having a plurality of openings 22 formed through the circumference thereof. One ball 20 is disposed in each of the openings 22. Thus, the cage 21 retains the balls 20 in the grooves 14 and 18 during use.

The cage 21 is formed having a spherical outer surface 23. The spherical outer surface 23 of the cage 21 is sized to conform to the spherical portion 17 of the inner surface 16 of the outer race 15, albeit slightly smaller in diameter. Thus, when the joint 10 is assembled as shown in FIG. 2, the spherical outer surface 23 of the cage 21 engages the spherical portion 17 of the inner surface 16 of the outer race 15. Consequently, the cage 21 is permitted to rotate relative to the outer race 15 during use, but is prevented from moving axially relative thereto. Because of the crossing orientation of the grooves 14 and 18 and the balls 20 disposed therein, the inner race 11 is also prevented from moving axially relative to the cage 21 and the outer race 15. Thus, the inner race 11, the cage 21, and the outer race 15 are all fixed axially in position relative to one another during use.

Referring now to FIG. 3, there is illustrated an alternate embodiment of a constant velocity universal joint, indicated generally at 30, in accordance with this invention. The joint 30 includes an inner race 31 which is generally hollow and cylindrical in shape. The inner race 31 has a central splined opening 32 formed therethrough. The splined opening 32 permits a shaft (not shown) to be inserted therein for rotation with the inner race 31 about an axis, as is well known in the art.

The inner race 31 has an outer surface 33 which is generally cylindrical in shape, but which is slightly curved along the axis of rotation. The outer surface 33 of the inner race 31 is further formed having a generally spherical portion 34, the purpose of which will be explained below. A plurality of grooves 35 are formed in the outer surface 33 of the inner race 31. In the illustrated embodiment, six of such grooves 35 are formed in the outer surface 33 of the inner race 31. The grooves 35 extend linearly and have generally semi-circular cross sectional shapes. The grooves 35 formed in the outer surface 33 of the inner race 31 are oriented so as to be alternately inclined relative to the rotational axis of the joint 30.

The joint 30 further includes an outer race 36 which is also generally hollow and cylindrical in shape. The outer race 36 may be formed having means for connecting it to a shaft (not shown) for rotation about the axis of rotation, as is well known in the art. Alternatively, the outer race 36 may be formed integrally with such shaft. The outer race 36 has an inner surface 37 which is generally cylindrical in shape, but which is slightly curved relative to the axis of rotation.

A plurality of grooves 38 are formed in the inner surface 37 of the outer race 36. The number of such grooves 38 is the same as the number of grooves 35 formed in the outer surface 33 of the inner race 31. As with the inner race grooves 35, the outer race grooves 38 extend linearly and have generally semi-circular cross sectional shapes. The grooves 38 formed in the inner surface 37 of the outer race 36 are oriented so as to be alternately inclined relative to the rotational axis of the joint 30. Each of the outer race grooves 38 is associated with a corresponding one of the inner race grooves 35. For each pair of associated inner and outer race grooves 35 and 38, the inner race groove 35 is inclined in one direction relative to the rotational axis of the joint, while the outer race groove 38 is inclined in the opposite direction.

A plurality of balls 40 are provided for effecting a driving connection between the inner race 31 and the outer race 36. One ball 40 is provided for each of the associated pairs of inner race grooves 35 and outer race grooves 38. As shown in FIG. 3, each ball 40 extends into both the inner race groove 35 and the outer race groove 38. Thus, when the inner race 31 is rotated about the axis of rotation, the outer race 36 rotates therewith. A cage 41 is provided for retaining the balls 40 within the grooves 35 and 38. The cage 41 is generally hollow and cylindrical in shape, having a plurality of openings 42 formed through the circumference thereof. One ball 40 is disposed in each of the openings 42. Thus, the cage 41 retains the balls 40 in the grooves 35 and 38 during use.

The cage 41 is formed having a spherical inner surface 43. The spherical inner surface 43 of the cage 41 is sized to conform to the spherical portion 34 of the outer surface 33 of the inner race 31, albeit slightly larger in diameter. Thus, when the joint 30 is assembled as shown in FIG. 3, the spherical inner surface 43 of the cage 41 engages the spherical portion 34 of the outer surface 33 of the inner race 31. Consequently, the cage 41 is permitted to rotate relative to the inner race 31 during use, but is prevented from moving axially relative thereto. Because of the crossing orientation of the grooves 35 and 38 and the balls 40 disposed therein, the outer race 36 is also prevented from moving axially relative to the cage 41 and the inner race 31. Thus, the inner race 31, the cage 41, and the outer race 36 are all fixed axially in position relative to one another during use.

It will be appreciated that both embodiments of this invention are fixed center joints, in that the centers of such joints are restrained from axial movement during use. In the first embodiment (shown in FIGS. 1 and 2), this is accomplished by the engagement of the spherical surfaces 17 and 23 formed on the outer race 15 and the cage 21, respectively. In the second embodiment (FIG. 3), this is accomplished by the cooperation of the spherical surfaces 34 and 43 formed on the inner race 31 and the cage 41, respectively. Thus, when manufactured and assembled as shown, both joints 10 and 30 are prevented from functioning as conventional cross groove joints, i.e., no axial movement of the center of the joint is permitted.

However, because of the inherent structures of these joints 10 and 30, the manufacturing processes therefor can be changed in a quick and easy manner to produce a conventional cross groove joint which does permit such axial movement of the center of the joint. In the first embodiment (FIGS. 1 and 2), this can be accomplished simply by not machining the spherical surface portion 17 on the inner surface 16 of the outer race 15. Rather, the inner surface 16 of the outer race 15 can be extended so as not to engage the cage 21. By not providing this spherical surface portion 17, there is no engagement between the outer race 15 and the cage 21 which would prevent the axial movement therebetween. Thus, the modified joint 10 would function as a typical cross groove joint so as to permit axial movement of the center thereof. In the second embodiment (FIG. 3), the same result can be accomplished simply by not machining the spherical surface portion 34 on the outer surface 33 of the inner race 31.

Thus, it can be seen that the same machinery and manufacturing processes can be used to manufacture the joints 10 or 30 in either the fixed center variety or axially movable center variety. The only difference in the manufacture of these two different varieties is whether the spherical surface 17 is formed on the outer race 15 of the first embodiment or whether the spherical surface 34 is formed on the inner race 31 of the second embodiment. The machining of such spherical surfaces 17 and 34 is a relatively simple task to accomplish using known metal cutting and grinding machines. This is because the tolerances associated with the basic structures of the inner and outer races are relatively large.

However, the formation of the grooves in both the inner and outer races is of critical importance. This is because it is the grooves of the inner and outer races which are engaged by the balls for providing the driving connection through the joint. Consequently, such grooves are typically precisely formed in the inner and outer races by broaching, milling, or a similar process. Because of the close tolerances involved, the machinery which is typically used to form these grooves cannot be quickly or easily changed from inclined grooves (to form a conventional cross groove joint which permits axial movement of the center) to axially oriented grooves (to form a conventional fixed center joint).

As mentioned above, it is a relatively simple matter to change the machining process to either include or exclude the spherical surface portions 17 and 34. When the spherical surface portions 17 or 34 are included, the joint 10 or 30 will function as a fixed center joint. When the spherical surface portions 17 or 34 are excluded, the joint 10 or 30 will function as a conventional cross groove joint permitting axial movement of the center. The important feature of the invention is that the grooves for the balls are be formed in exactly the same locations using exactly the same machinery for either the fixed center variety or the axially movable center variety. This flexibility in manufacturing the joints 10 and 30 provides a significant reduction in time and money for manufacturing both varieties.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed is:

1. A constant velocity universal joint comprising:

a hollow outer race defining a rotational axis, said outer race including an inner surface which extends along said rotational axis, a plurality of linearly extending grooves formed in said inner surface which are alternately inclined relative to said rotational axis, and a single spherical portion formed in said inner surface which extends only partially along said rotational axis;

an inner race disposed within said outer race, said inner race including an outer surface which extends along said rotational axis and a plurality of linearly extending grooves formed in said outer surface which are alternately inclined relative to said rotational axis, each of said inner race grooves being associated with an outer race groove, said associated inner and outer race grooves being inclined in opposite directions relative to the rotational axis of the joint;

a hollow cage disposed between said outer race and said inner race, said cage including a single outer spherical surface which engages said single spherical portion of said inner surface of said outer race to prevent said cage from moving axially relative to said outer race, said single spherical portion of said inner surface of said outer race and said single outer spherical surface of said hollow cage providing the only point of contact between said outer race and said hollow cage, said hollow cage not engaging said inner race at any point, said hollow cage further including a plurality of openings formed therethrough; and a ball disposed in each of said plurality of openings formed through said cage, said balls extending into said associated inner and outer race grooves to provide a rotational driving connection between said outer race and said inner race.

* * * * *